United States Patent
Kray et al.

(10) Patent No.: US 8,632,327 B2
(45) Date of Patent: Jan. 21, 2014

(54) APPARATUS TO APPLY A VARIABLE SURFACE TEXTURE ON AN AIRFOIL

(75) Inventors: Nicholas Joseph Kray, Mason, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 3 days.

(21) Appl. No.: 13/304,928

(22) Filed: Nov. 28, 2011

(65) Prior Publication Data
US 2013/0134292 A1 May 30, 2013

(51) Int. Cl.
*B28B 11/08* (2006.01)

(52) U.S. Cl.
USPC ............. 425/63; 425/101; 425/318; 425/385; 425/470

(58) Field of Classification Search
CPC ........................................................ B28B 11/08
USPC ............. 425/385, 403, 470, 63, 89, 101, 318, 425/363; 264/219–222, 225, 227
See application file for complete search history.

(56) References Cited

U.S. PATENT DOCUMENTS

| | | | | |
|---|---|---|---|---|
| 1,347,028 A | * | 7/1920 | Gstalder | 427/262 |
| 1,436,155 A | * | 11/1922 | Domy | 101/376 |
| 1,991,996 A | * | 2/1935 | Lodewijk | 427/270 |
| 3,893,795 A | * | 7/1975 | Nauta | 425/403 |
| 3,910,711 A | * | 10/1975 | Moorhead | 404/89 |
| 3,910,738 A | * | 10/1975 | Chandler et al. | 425/162 |
| RE33,312 E | * | 8/1990 | Elliot | 404/124 |
| 5,206,979 A | * | 5/1993 | Campbell | 492/13 |
| 5,421,670 A | * | 6/1995 | Meirick | 404/124 |
| 5,806,130 A | * | 9/1998 | Pascoe | 15/230.11 |
| 6,345,791 B1 | | 2/2002 | McClure | |
| 6,390,204 B1 | * | 5/2002 | Schafle | 172/554 |
| 6,923,630 B2 | * | 8/2005 | Allen | 425/63 |
| 2005/0046089 A1 | * | 3/2005 | Laird et al. | 264/546 |
| 2008/0067717 A1 | * | 3/2008 | Lampignano | 264/293 |
| 2010/0012216 A1 | * | 1/2010 | Salatino et al. | 138/118 |
| 2011/0156294 A1 | * | 6/2011 | Yu et al. | 264/2.1 |

FOREIGN PATENT DOCUMENTS

| | | | | |
|---|---|---|---|---|
| DE | 3408419 A1 | * | 9/1985 | B29C 33/42 |
| DE | 19927888 A1 | * | 12/2000 | B28B 21/24 |
| GB | 2441660 A | * | 3/2008 | B65H 27/00 |
| JP | 59089137 A | * | 5/1984 | B29F 3/04 |
| JP | 60073835 A | * | 4/1985 | B29C 69/00 |
| JP | 07217053 A | * | 8/1995 | E04C 2/04 |

OTHER PUBLICATIONS

Klump, et al., Riblets in Turbulet Flow Regimes of 2-D Compressor Blades, Proceedings of ASME Turbo Expo 2009: Power for Land, Sea and Air, Jun. 8-12, 2009, pp. 1-10, GT2009-59352, American Society of Mechanical Engineers, USA.

* cited by examiner

*Primary Examiner* — Dimple Bodawala
(74) *Attorney, Agent, or Firm* — General Electric Company; William Scott Andes

(57) ABSTRACT

A drum is provided having a peripheral surface with texture features thereon. The texture features may be a plurality of grooves for applying riblets to an airfoil surface. Methods of using the drum are also provided.

17 Claims, 3 Drawing Sheets

APPARATUS TO APPLY A VARIABLE SURFACE TEXTURE ON AN AIRFOIL

TECHNICAL FIELD

This invention generally pertains to gas turbine engines, and particularly to an apparatus to apply a surface texture on an airfoil thereof and methods pertaining thereto.

BACKGROUND

Riblets disposed on an airfoil in a proper orientation may result in a reduced drag coefficient of that airfoil. Therefore, embodiments of the present invention are aimed at creating riblets on airfoils.

SUMMARY

A drum is provided having a peripheral surface with texture features thereon. The texture features may be a plurality of grooves for applying riblets to an airfoil surface. Methods of using the drum are also provided.

BRIEF DESCRIPTION OF THE ILLUSTRATIONS

Embodiments of the invention are illustrated in the following illustrations.

DETAILED DESCRIPTION

Figure 1:
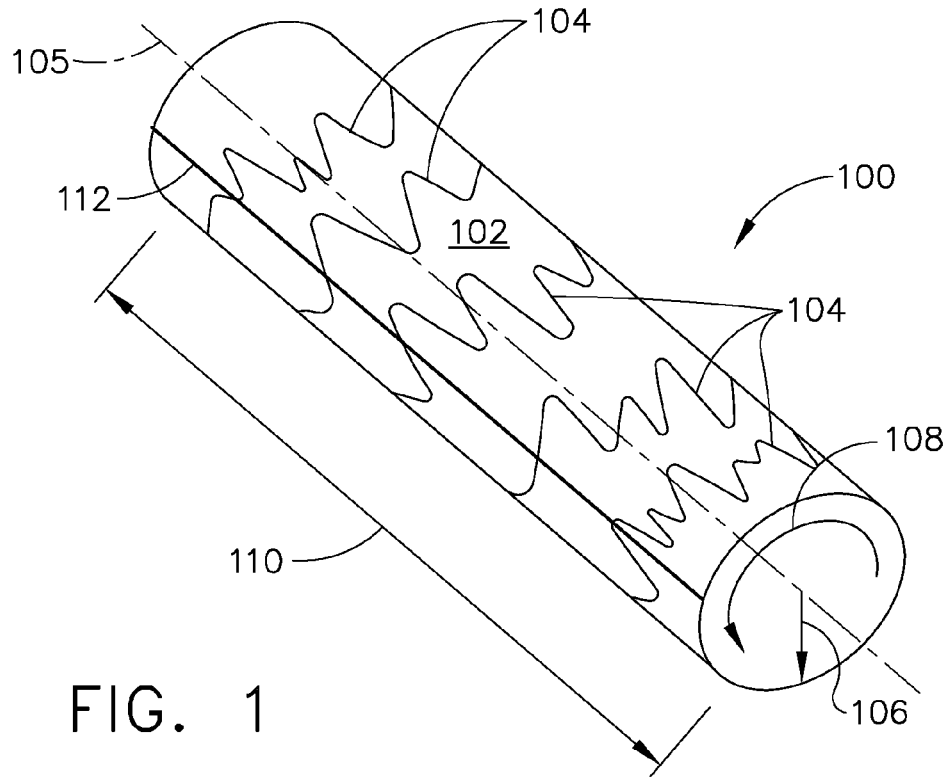
FIG. 1 shows an embodiment of the present invention as a drum having a generally constant perimeter along its length.
Figure 2:
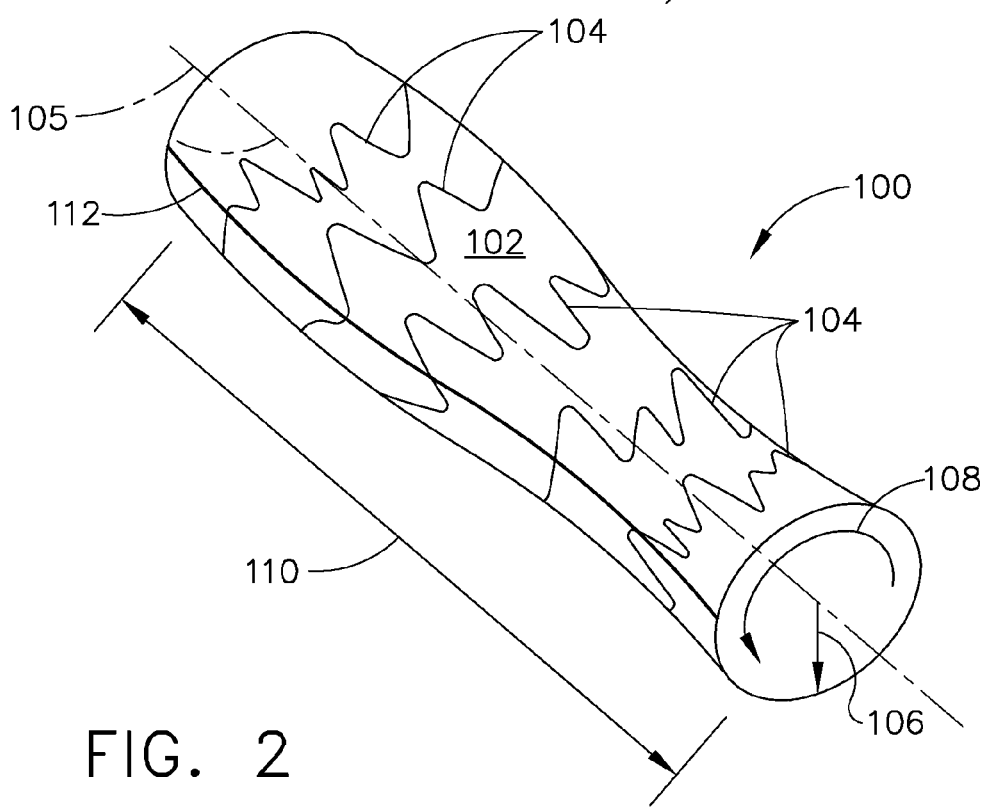
FIG. 2 depicts an embodiment of the present invention as a drum having a varied perimeter along its length.

Referring to FIGS. 1 and 2, an embodiment of an apparatus for applying a texture to a surface of the present invention is shown as a drum 100. The drum 100 is provided with a peripheral surface 102 disposed along the length of the drum 100. Texture features 104 are disposed on this peripheral surface 102. These features 104 may be ridges or grooves. The features 104 may be grooves, thus giving the peripheral surface 102 an appearance of ridges. However, the features 104 may also be looked at as ridges, such that the peripheral surface 102 takes on the appearance of grooves. For the purposes of this discussion, the features 104 will be referred to as grooves. These grooves 104 preferably have a geometry that is a negative impression of riblets 204 (shown in FIG. 4, discussed herein). These riblets 204 are disposed on a surface 202 (shown in FIG. 4) on which the drum 100 is to apply a texture.

The drum 100 may have a preferred direction of rotation, depicted by arrow 108. However, it is also possible that the drum 100 may be used by rolling it in either direction. The drum 100 may also have a first end and an opposite second end with a length dimension 110 measured therebetween. The drum 100 may also have an index line 112 that provides an indicator as to what orientation the drum 100 is to be in when first placed on a surface 202 to which it will apply a texture.

Referring specifically to FIG. 1, the drum 100 may also be provided with a longitudinal axis 105, preferably disposed centrally through the drum 100. A drum radius 106 may be measured between the longitudinal axis 105 and the closest point on the peripheral surface. The radius 106 may be uniform about the longitudinal axis 105 and along the drum length 110. In such an instance, the drum the drum 100 may be considered to be generally cylindrical. A uniform radius 106 will also provide a drum 100 in which any cross-section taken along the length of the drum 100 will be generally circular in shape, with a generally uniform circumference throughout all cross-sections. Such a drum 100, and its corresponding peripheral surface 102, could be considered generally cylindrical. With a uniform radius 106, the drum 100 and peripheral surface 102 may also be considered to be axisymmetric. For the purposes of this discussion, any mention of a cross-section shall be construed to mean a cross-section taken on a plane orthogonal to the longitudinal axis 105

Referring now to FIG. 2, a drum 100 of an embodiment of the present invention is provided with a varied and non-uniform cross-section along the drum length 110. Accordingly, the radius 106 will also be varied and non-uniform. This variation in the radius 106 may vary along the drum length 110, or may vary about the longitudinal axis 105, or both. Such a drum 100 would therefore have a peripheral surface with a varied topography.

As stated, the radius may vary along the drum length 110. However for any particular cross-section, the radius 106 may be uniform about the longitudinal axis 105 such that any given cross-section may be generally circular. Such a drum 100, and its corresponding peripheral surface 102, would not be considered to be cylindrical, but they would be considered to be axisymmetric.

The radius may also vary about the longitudinal axis 105, such that any given cross-section will be non-circular. Such a drum 100 would neither be considered cylindrical, nor axisymmetric. While the radius 106 may vary about the longitudinal axis 105, the any given cross-section taken along the drum length 110 may be substantially the same as any other cross-section.

In addition, the radius 106 may vary both along the drum length 100 and about the longitudinal axis 105. This embodiment of a drum 100 may, therefore, have circular cross-sections and non-circular cross-sections, all of which may vary along the drum length 110.

The exact configuration of the drum 100 depends on the surface 202 (FIG. 4) to which it is to apply a texture. The shape of the drum 100 and topography of the peripheral surface 102 should be chosen such that the peripheral surface 102 continuously remains in contact with that surface 202 throughout the process of adding texture to that surface 202.

Figure 3:
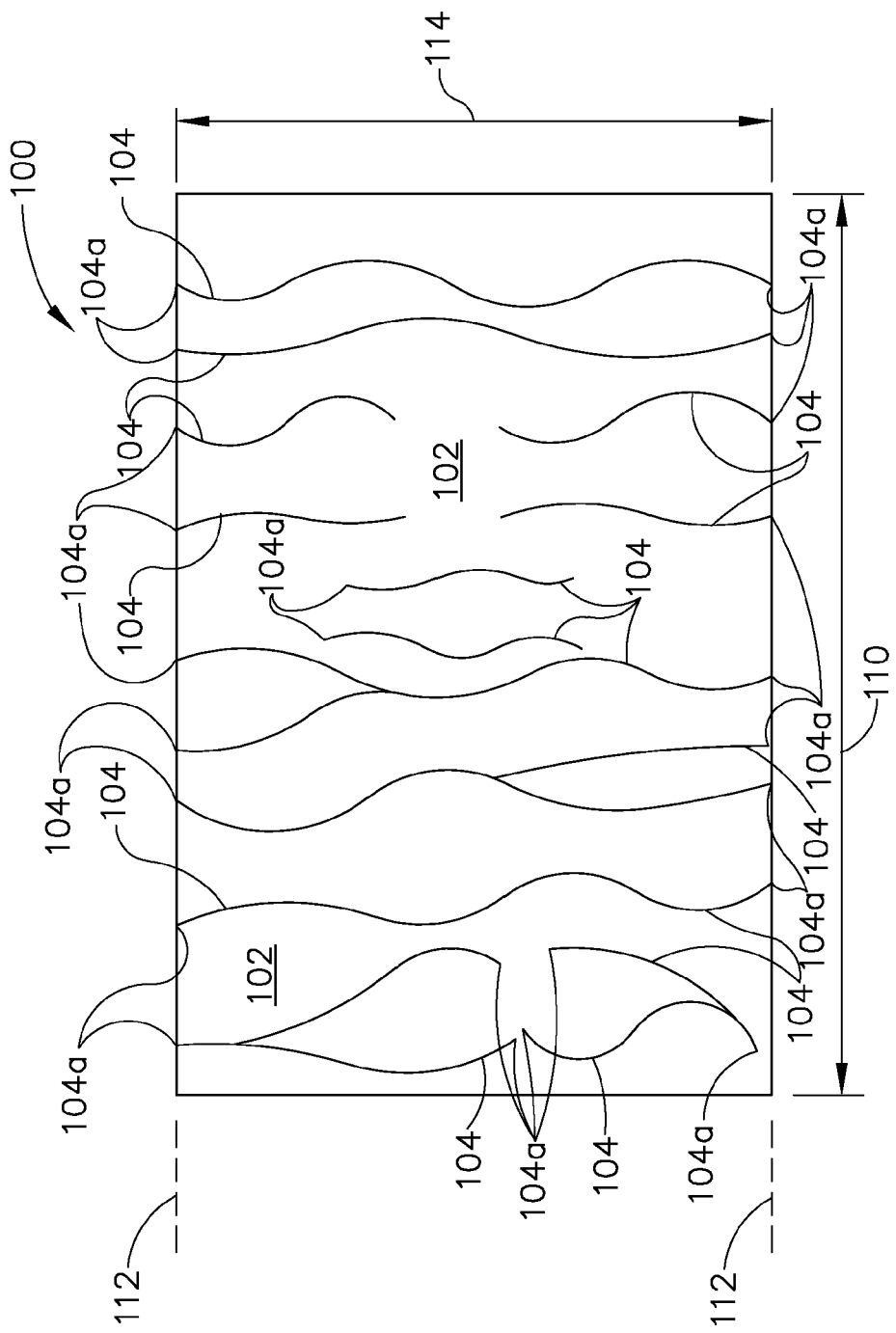
FIG. 3 illustrates a two-dimensional representation of a peripheral surface of an embodiment of the present invention.

Referring now to FIG. 3, a two-dimensional representation of an embodiment of a peripheral surface 102 of the present invention is illustrated, as if this peripheral surface 102 were to be un-wrapped from the remainder of the drum 100. This representation makes it easier to show the various grooves 104 that may be disposed on the peripheral surface 102. The peripheral surface 102 is shown along a length 110 with the index line 112 shown at the top and bottom edges. Between these edges, a perimeter dimension 114 is shown. For simplicity, this representation relates to a generally cylindrical drum 100, such that the perimeter dimension may be considered a circumference.

For simplicity, FIG. 3 only depicts a few grooves 104. However, the grooves 104 may be disposed on the peripheral surface in any configuration, orientation, or density. For example, the grooves 104 may be configured to be linear or possess a simple or complex curve. A linear groove 104 may be oriented such as to follow a path on a plane that is generally orthogonal to the longitudinal axis 105, or on a plane that is skew of the longitudinal axis 105. Also, the density of grooves may be uniform or varied across the peripheral surface 102. Furthermore, it is to be understood that the configurations, orientations, and density of the grooves 104 may vary across the peripheral surface 102. A portion of the grooves 104 may be substantially linear, some may possess a simple curve, others may possess a complex curve, and others still may possess a combination of the aforementioned.

The grooves 104 disposed on the peripheral surface 102 may take a variety of configurations. The grooves are shown as having two opposing ends 104a. Some grooves 104 may extend from a first end 104a on the index line 112 completely around the perimeter of the peripheral surface 104, such that a second end 104a is also on the index line 112. For some grooves, the opposing ends 104a may be placed at the same location on the index line such that the groove 104 effectively has no ends 104a. Other grooves 104 may extend from the index line 112 in either direction, and others may be disposed completely separate from the index line 112. Some grooves 104 may join together such that they share a single common end 104a, or both ends 104a may be in common. The grooves 104 possess a middle portion between the ends 104a, and some grooves 104 may be joined together for at least a portion of the middle portion. While FIG. 3 only shows examples of two grooves 104 joining together, it is to be understood that any number of grooves 104 may join or share common points along their length.

The grooves 104 may have a length between its respective opposed ends 104a. The length is measured so as to follow a curved path that the groove 104 may take. Accordingly, grooves 104 may take such a curved or tortuous path such as to have a length that is greater than a perimeter 114 of the drum 100. Also, a groove 104 does not have to circle the entire peripheral surface to have such a length. Furthermore, a generally linearly groove may take such a skewed path about the peripheral surface 102, that it may too have a length that is greater than a drum perimeter 114.

Figure 4:
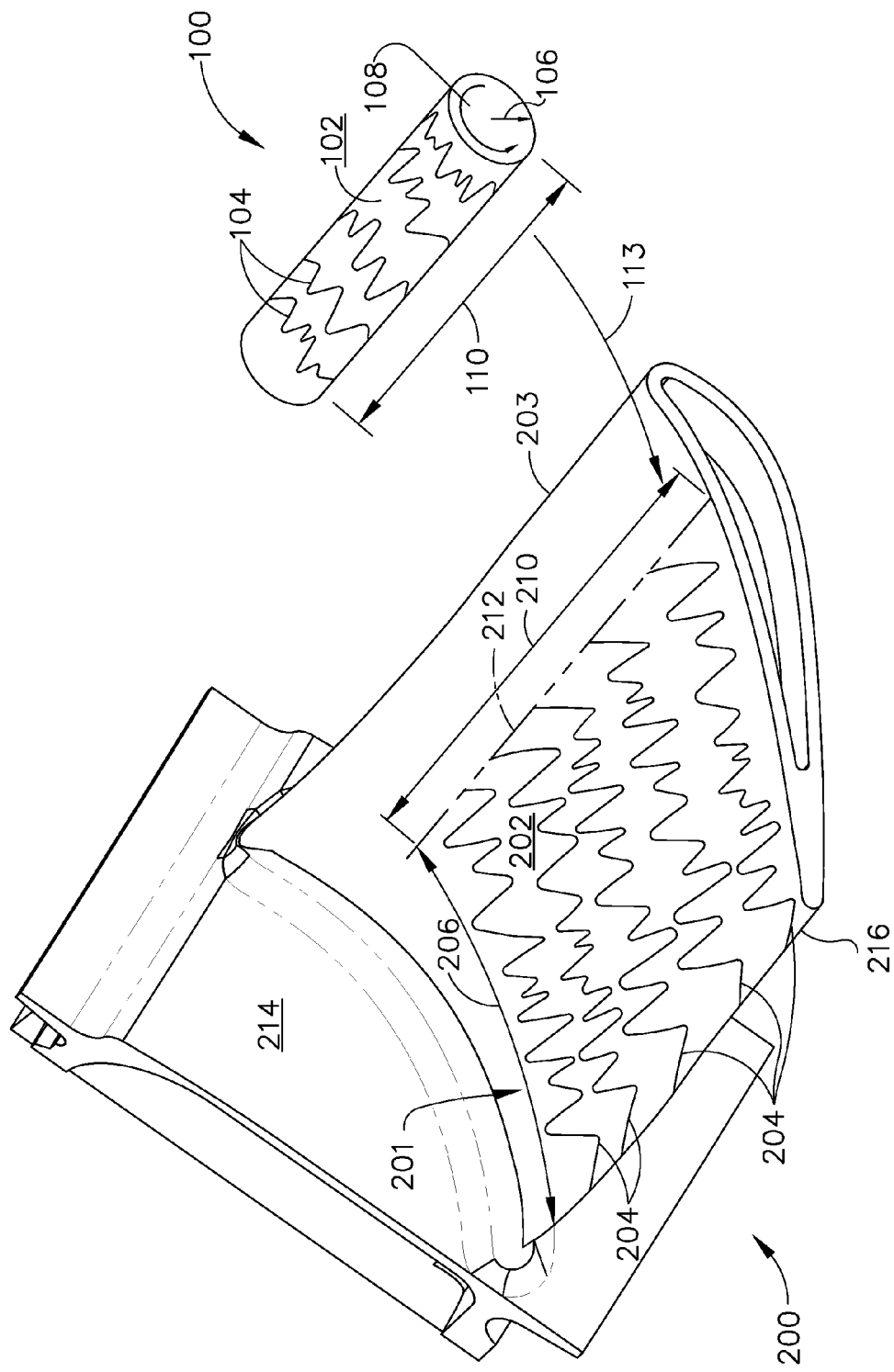
FIG. 4 represents an embodiment of the present invention used in applying a textured surface on an airfoil.

The grooves 104 may also possess variations in width, depth, and profile. These dimensions are preferably determined by the desired texture that is to be applied to surface 202 (FIG. 4).

While the grooves 104 may share common points, possess a variety of curves or linear paths, and vary in length, width, and profile, it is to be understood that any transition the grooves take are preferably smooth transitions free of abrupt changes.

The drum 100 may be manufactured of a hard metal, such as, for example, steel. A metal drum 100 may be used in applying texture to a hard surface, such as, for example, a titanium airfoil. The metal drum 100 would preferably be harder than the surface it would be applying a texture to. A metal drum 100 may be created by any generally known means, such as, for example, physical machining, chemical etching, electric discharge machining, or any combination thereof.

Alternatively, the drum 100 may be manufactured of a flexible material, such as, for example, rubber. A rubber drum 100 may be used to apply texture to softer materials, such as, for example, polyurethane materials. Such polyurethane materials may typically be applied to composite airfoil surfaces for erosion protection. Upon application of the drum, the polyurethane material would flow into the grooves 104, and, as the polyurethane cured, form surface riblets. A rubber drum 100 may be manufactured by any generally known means, such as, for example, molding.

Referring now to FIG. 4, a general depiction of how an embodiment of a drum 100 of the present invention may be used to apply a texture to a surface on a blade 200. The blade 200 may be a blade as commonly found in any gas turbine engine. The blade 200 is provided with an airfoil 201 having an airfoil surface 202. A typical blade 200 will also be provided with a platform 214 from which the airfoil 201 extends. The airfoil 201 also has a leading edge 203 and a trailing edge 216 and extending from the blade platform 214 to the airfoil tip (not shown). FIG. 4 depicts riblets 204 disposed on the airfoil surface 202, however these will only be present after the drum 100 has been utilized to apply them.

The airfoil surface 202 that is to be textured will have a textured surface length dimension 210 that roughly corresponds to the drum length 110 (not shown to scale). The textured surface length dimension 210 is generally measured as being along an axis of the airfoil that extends from the platform 214 to the airfoil tip (not shown). The textured surface 202 also has a textured surface width dimension 206 that roughly corresponds to the drum 100 perimeter, which can generally be determined by the drum radius 106 as described herein. The textured surface width dimension 206 is generally measured across the airfoil surface in a direction extending between the leading edge 203 and the trailing edge 216.

The textured portion of the airfoil surface 202 is shown as being generally rectangular in shape and extending across the trailing edge 216. However, it is to be understood that the textured portion of the airfoil surface 202 will simply take a transferred form from the drum peripheral surface 102. Therefore, the features transferred to the textured portion of the airfoil surface 202 may generally take any shape.

In use, the drum 100 is to be applied to the airfoil surface 202 at a starting point and rolled over it to impress the drum peripheral surface 102 into the airfoil surface. Preferably, the drum index line 112 (out of view in FIG. 4) will be placed to a corresponding starting location on the airfoil 201, which is line 212 in the present example.

For a metal drum 100 and corresponding metal airfoil 201, the drum 100 is moved into position over the airfoil surface, see arrow 113. The drum index line 112 is then aligned with airfoil starting line 212. The drum 100 is then lowered such that the drum peripheral surface 102 contacts the airfoil surface 202. A force is applied to drive the drum peripheral surface 102 into the airfoil surface 202, and that force is maintained as the drum 100 is rolled across the airfoil 201. The force is preferably great enough to press the peripheral surface into the airfoil surface 202 such that portions of the airfoil surface 202 are depressed and other portions take the shape of the drum grooves 204. The portions of the airfoil surface 202 that take the shape of the drum grooves 204 then become riblets 204 on the airfoil surface 202. The textured portion of the airfoil surface 202 now has a negative impression of the textured pattern found on the drum peripheral surface 102.

It preferably only takes one rolling pass of the drum 100 to imprint riblets 204 onto the airfoil surface 202, but it may take multiple passes. The imprinting process may be a cold work process, or, alternatively, heat may be applied to assist in deforming the airfoil surface 202.

For a rubber drum 100 and corresponding polyurethane coat on a composite airfoil 201, the general process remains substantially the same. However instead of deforming the airfoil surface 202, the drum 100 will only need a sufficient applied force such that the polyurethane coat flows into the drum grooves 104. This may be formed at some stage of the polyurethane curing process such that the material will flow into the grooves 104, yet maintain shape until fully cured.

For substantially flat sections of an airfoil surface 202, a substantially cylindrical drum 100 may be employed. For sections of an airfoil surface 202 with small curves, a drum 100 with a non-uniform radius or of a non-uniform cross-section may need to be employed in order for the peripheral surface 102 to maintain contact with the airfoil surface 202 through the rolling process. For an airfoil surface 202 with greater curves, it may not be feasible to use a single drum along the entire airfoil 201 length. Therefore, multiple drums 100 may have to work the airfoil surface 202 along the airfoil length. However, it is still envisioned that each section would only take one rolling pass of the drum.

Any of the apparatuses and processes described herein are envisioned to provide an airfoil surface 202 with riblets 204 having smooth transitions throughout their length. The resulting riblets 204 may typically have a height dimension of 0.003 inches to 0.006 inches. Furthermore, the application of these riblets 204 may produce a reduction in the drag coefficient of the airfoil by as much as 10 percent. However, results may vary.

While the texture features 104 discussed herein have been referred to as ridges or grooves used in creating riblets 204, it is to be understood that other surface features may be employed.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain forms of an apparatus to apply a variable surface texture have been illustrated and described, it is not limited thereto and instead will only be limited by the claims, appended hereto. All referenced documents are incorporated by reference herein.

The invention claimed is:

1. An apparatus for applying a texture to an airfoil surface, comprising:
   a substantially cylindrical drum having a first drum end and an opposing second drum end defining a drum length therebetween, a longitudinal axis therethrough extending from said first drum end to said second drum end, and a peripheral surface disposed along said drum length;
   wherein said peripheral surface comprises a base surface with a plurality of depressed grooves extending into said base surface, and further comprising an index line located at said peripheral surface and extending from said first drum end to said second drum end and being substantially parallel to said longitudinal axis;
   wherein a perimeter of said substantially cylindrical drum is generally equal to a length of said texture on said airfoil surface;
   wherein each of said plurality of grooves has a first groove end and a second groove end; and,
   wherein, for at least a portion of said plurality of grooves, said first groove end terminates at said index line and said second groove end terminates at said index line;
   further wherein each of said plurality of grooves have a middle portion disposed between said first groove end and said second groove end, and wherein two or more adjacent grooves of said plurality of grooves share a common middle portion.

2. The apparatus of claim 1, wherein two or more adjacent grooves of said plurality of grooves share a common first groove end, a common second groove end, or both.

3. The apparatus of claim 1, wherein said drum is flexible.

4. The apparatus of claim 1, wherein each of said plurality of grooves has a groove length as measured between said first groove end and said second groove end, and wherein, for at least a portion of said plurality of grooves, said groove length is equal to or larger than a perimeter of said generally cylindrical drum.

5. The apparatus of claim 1, wherein at least a portion of said plurality of grooves have a varied orientation about said peripheral surface.

6. An apparatus for applying a texture to an airfoil surface, comprising:
   a drum having a first drum end and an opposing second drum end defining a drum length therebetween, and a peripheral surface disposed along said drum length;
   an index line along said peripheral surface and extending between said first drum end and said second drum end and indicating a starting point and an ending point for a single revolution of said drum;
   wherein said peripheral surface comprises a plurality of depressed grooves extending into said peripheral surface;
   wherein each of said plurality of grooves has a first groove end and a second groove end; and
   wherein, for at least a portion of said plurality of grooves, said first groove end terminates at a first location on said peripheral surface and said second groove end terminates at a second location on said peripheral surface;
   further wherein each of said plurality of grooves have a middle portion disposed between said first groove end and said second groove end, and wherein two or more adjacent grooves of said plurality of grooves share a common middle portion.

7. The apparatus of claim 6, wherein two or more adjacent grooves of said plurality of grooves share a common first groove end, a common second groove end, or both.

8. The apparatus of claim 6, wherein at least a portion of said plurality of grooves have a varied depth into said base surface about said peripheral surface.

9. The apparatus of claim 6, wherein said peripheral surface is axisymmetric about said longitudinal axis.

10. The apparatus of claim 6, wherein said peripheral surface has a constant perimeter along said length of said drum.

11. The apparatus of claim 6, wherein said drum is substantially cylindrical and has a longitudinal axis disposed therethrough and a constant radius about said longitudinal axis and along said drum length.

12. The apparatus of claim 6, wherein at least a portion of said plurality of grooves have a varied orientation about said peripheral surface.

13. An apparatus for applying a texture to an airfoil surface, comprising:
   a substantially cylindrical drum having a first drum end and an opposing second drum end defining a drum length therebetween, a longitudinal axis therethrough extending from said first drum end to said second drum end, and a peripheral surface disposed along said drum length;
   an index line disposed on said drum indicating a starting point and ending point for a single revolution of said substantially cylindrical drum;
   wherein said peripheral surface comprises a plurality of depressed grooves extending into said peripheral surface; and
   wherein said substantially cylindrical drum has a circumferential dimension that varies along said length of said generally cylindrical drum;

further wherein each of said plurality of grooves have a middle portion disposed between said first groove end and said second groove end, and wherein two or more adjacent grooves of said plurality of grooves share a common middle portion.

14. The apparatus of claim 13, wherein said peripheral surface is axisymmetric about said longitudinal axis.

15. The apparatus of claim 13, wherein said peripheral surface has a varied perimeter along said length of said generally cylindrical drum.

16. The apparatus of claim 13, wherein said generally cylindrical drum has a varied radius about said longitudinal axis along said drum length.

17. The apparatus of claim 13, wherein at least a portion of said plurality of grooves have a varied orientation about said peripheral surface.

\* \* \* \* \*